(12) United States Patent
Calderone et al.

(10) Patent No.: US 9,380,907 B2
(45) Date of Patent: Jul. 5, 2016

(54) DISPENSER WITH HOLDING SYSTEM FOR RECEPTACLES OF DIFFERENT SIZES

(71) Applicant: NESTEC S.A., Vevey (CH)

(72) Inventors: Roberto Angelo Calderone, Orny (CH); Cedric Rey, La Sarraz (CH); Guillaume Langloy, Attika (GR)

(73) Assignee: Nestec S.A., Vevey (CH)

( * ) Notice: Subject to any disclaimer, the term of this patent is extended or adjusted under 35 U.S.C. 154(b) by 4 days.

(21) Appl. No.: 14/390,105

(22) PCT Filed: Mar. 28, 2013

(86) PCT No.: PCT/EP2013/056711
§ 371 (c)(1),
(2) Date: Oct. 2, 2014

(87) PCT Pub. No.: WO2013/149937
PCT Pub. Date: Oct. 10, 2013

(65) Prior Publication Data
US 2015/0053303 A1  Feb. 26, 2015

(30) Foreign Application Priority Data
Apr. 3, 2012  (EP) .................................. 12162965

(51) Int. Cl.
*A47J 31/44* (2006.01)
*B67D 1/08* (2006.01)

(52) U.S. Cl.
CPC ........... *A47J 31/4482* (2013.01); *B67D 1/0878* (2013.01); *B67D 1/0891* (2013.01)

(58) Field of Classification Search
CPC .. A47J 31/4482; B67D 1/0878; B67D 1/0891; B67D 1/0894
USPC ..................... 141/346, 369, 378, 379, 1–2, 94
See application file for complete search history.

(56) References Cited

U.S. PATENT DOCUMENTS

| 5,161,455 A | 11/1992 | Anson et al. | |
| 6,637,478 B2 * | 10/2003 | Jungmann | B65B 57/06 141/104 |

FOREIGN PATENT DOCUMENTS

| DE | 202009001492 | 7/2010 |
| EP | 1867260 | 12/2007 |

* cited by examiner

*Primary Examiner* — Mark A Laurenzi
*Assistant Examiner* — Timothy P Kelly
(74) *Attorney, Agent, or Firm* — K&L Gates LLP

(57) ABSTRACT

The invention concerns a beverage dispenser (1) comprising a base (2) and a holding system that comprises a holding part (3) positionable beneath a beverage outlet (4) in order to accept a first, relatively small receptacle, and being configured and dimensioned to be moveable between a deployed holding position suitable for accepting the small receptacle and a second position in which the holding part is moved at least partly out of the way of the beverage outlet to create an unoccupied space in which a second, larger receptacle can be positioned, in place of the first receptacle, beneath the beverage outlet, wherein the holding system comprises a sensor (8) configured for detecting the position of the holding part between the first position and the second position.

6 Claims, 6 Drawing Sheets

DISPENSER WITH HOLDING SYSTEM FOR RECEPTACLES OF DIFFERENT SIZES

CROSS REFERENCE TO RELATED APPLICATIONS

The present application is a National Stage of International Application No. PCT/EP2013/056711, filed on Mar. 28, 2013, which claims priority to European Patent Application No. 12162965.3, filed Apr. 3, 2012, the entire contents of which are being incorporated herein by reference.

FIELD OF THE INVENTION

The present invention relates to beverage dispensers configured for producing beverages in receptacles of different sizes.

BACKGROUND OF THE INVENTION

There is a consumer demand for beverages dispensers that can deliver a variety of beverages in receptacles of different sizes. For example, some machines are capable of preparing an espresso coffee or a long American coffee in a small or medium cup and a latte macchiato coffee in a large cup.

During the dispensing of a beverage it is usually important to maintain a short distance between the beverage outlet and the receptacle in order to produce a good quality froth particularly for getting the "crema" of an espresso coffee, besides avoiding the risk of spatter. What is required, therefore, is a system that can incite the user to choose the correct holder and to set a correct distance between the beverage outlet and the receptacle.

EP 1 867 260 describes a holder and drip-collecting system that can be positioned either in a first deployed position for supporting small receptacles or in a second retracted position enabling the positioning of larger receptacles. An inconvenient of the above system is that the dispenser can deliver small size beverages like an espresso coffee in receptacles positioned at a high distance from the beverage outlet. If the consumer doesn't pay attention to the choice of the receptacle size and the position of the holder and drip-collecting system an espresso coffee is not prepared with the optimal quality.

The object of the present invention is to propose a beverage dispenser answering the above problem and able to incite the customer to always place the right cup at the right dispensing position.

SUMMARY OF THE INVENTION

According to a first aspect, the invention concerns a beverage dispenser comprising a holding system that comprises a holding part positionable beneath a beverage outlet in order to accept a first, relatively small receptacle, and being configured and dimensioned to be moveable between a deployed holding position suitable for accepting the small receptacle and a second position in which the holding part is moved at least partly out of the way of the beverage outlet to create an unoccupied space in which a second, larger receptacle can be positioned, in place of the first receptacle, beneath the beverage outlet, wherein the holding system comprises a sensor configured for detecting the position of the holding part between the first position and the second position, and wherein the beverage dispenser comprises an alerting device for inciting the consumer to move the holding part of the holding system from one position to the other.

Usually the beverage dispenser comprises an input device for selecting different beverages differing at least by the sizes of the dispensed beverages. In particular the beverage dispenser can be configured for preparing beverages presenting volumes varying between 25 and 1000 ml. Preferably the list of beverages susceptible to be prepared by the dispenser comprises at least an espresso coffee and/or a ristretto coffee.

The sensor can be any presence sensor like a switch, a capacitive type sensor or an optical sensor.

The receptacle holding part is preferably associated with the base as a cantilever projection when the holder is in the deployed position. Also, the holding part may be configured and positioned for rotation between the deployed position and the second position. For this, holding part may be hinged about an axis of rotation allowing the part to be moved upwards and out of the way of the beverage outlet.

If desired, the holding part may be movable along or into a housing in the base. When intended, the device may further comprise a housing into which the holding part is inserted by a sliding action.

According to a second aspect the invention concerns a process for operating a beverage dispenser such as described hereabove and comprising the steps of:
- receiving an input from a consumer for selecting a beverage,
- identifying the size of the cup corresponding to the selected beverage,
- checking if the position of the holding part corresponds to the identified size of the cup,
- if not, requesting the consumer to move the holding part in the other position,
- dispensing the selected beverage when the position of the holding part corresponds to the identified size of the cup.

BRIEF DESCRIPTION OF THE DRAWINGS

The characteristics and advantages of the invention will be better understood in relation to the following figures.

DETAILED DESCRIPTION OF THE DRAWINGS

Figure 1:
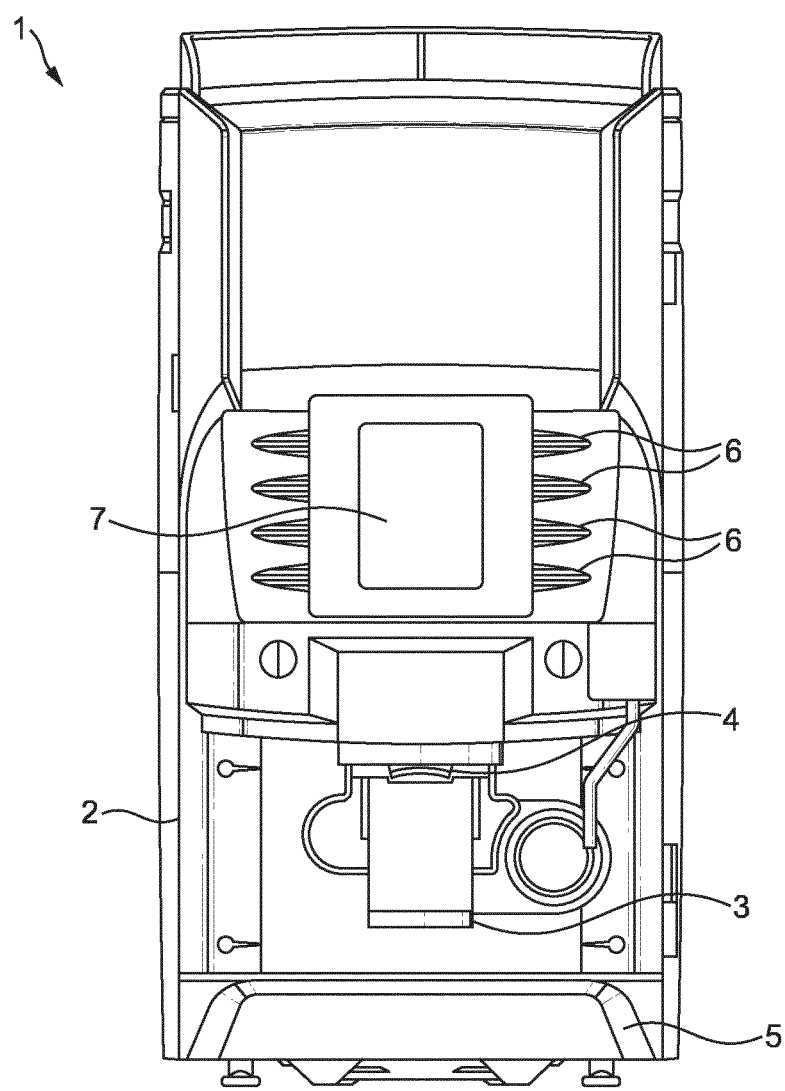
FIG. 1 is a general view of a beverage dispenser in which the present invention can be implemented.
Figure 2:
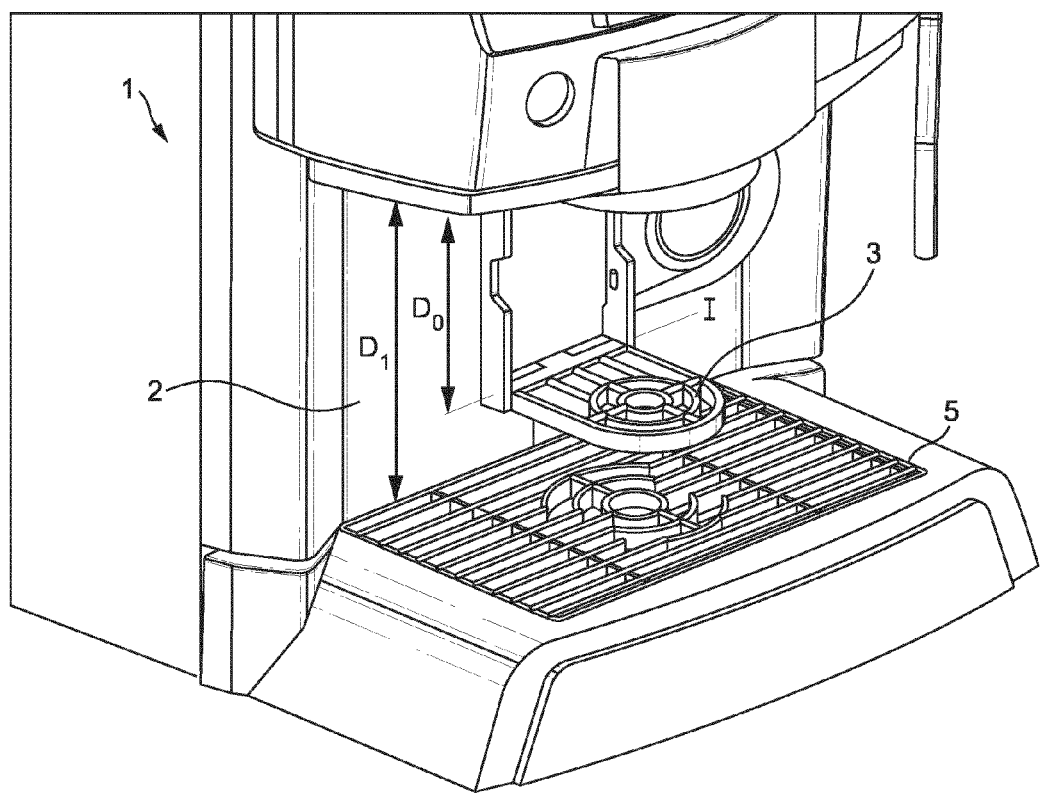
FIGS. 2 and 3 are two perspective views of the dispensing area of a beverage dispenser according to the present invention with the holding part of the holding system in the first deployed position.
Figure 3:
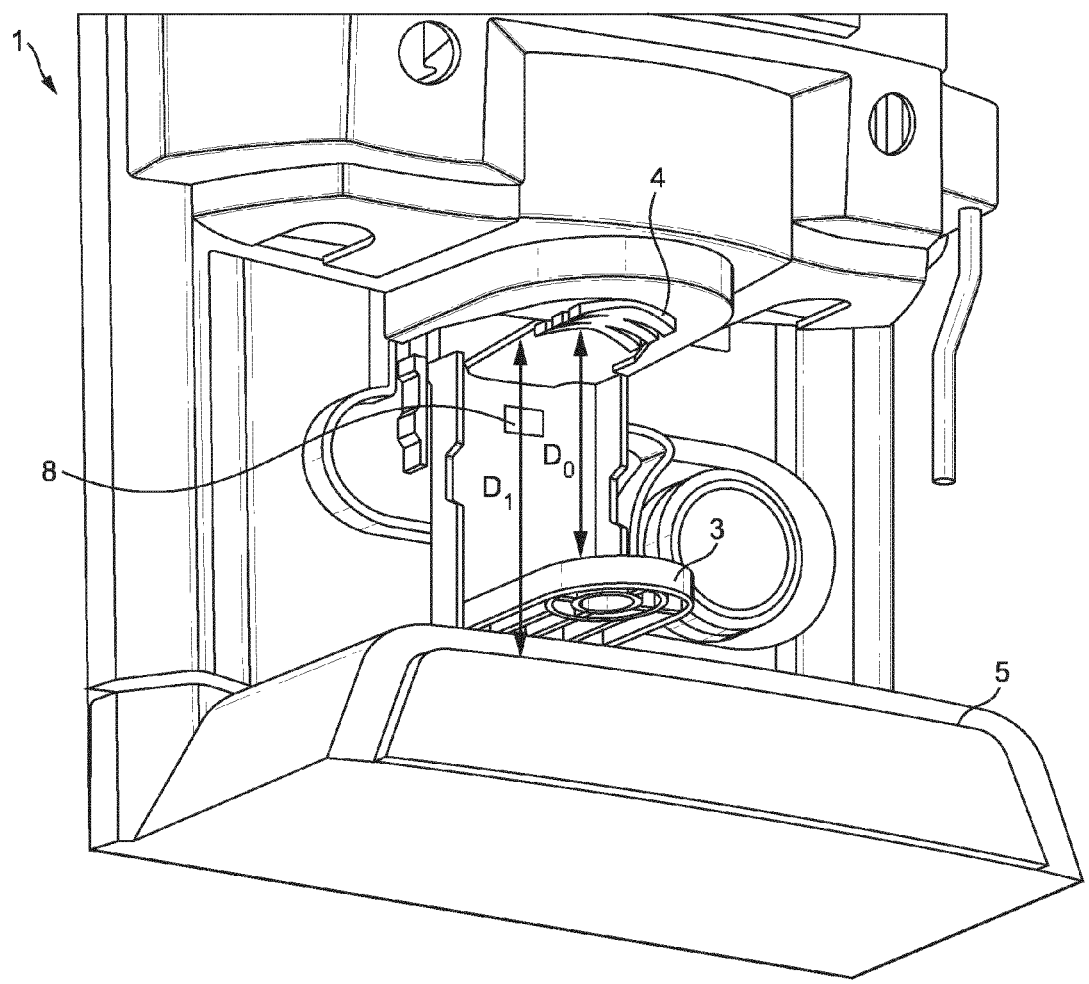
Figure 4:
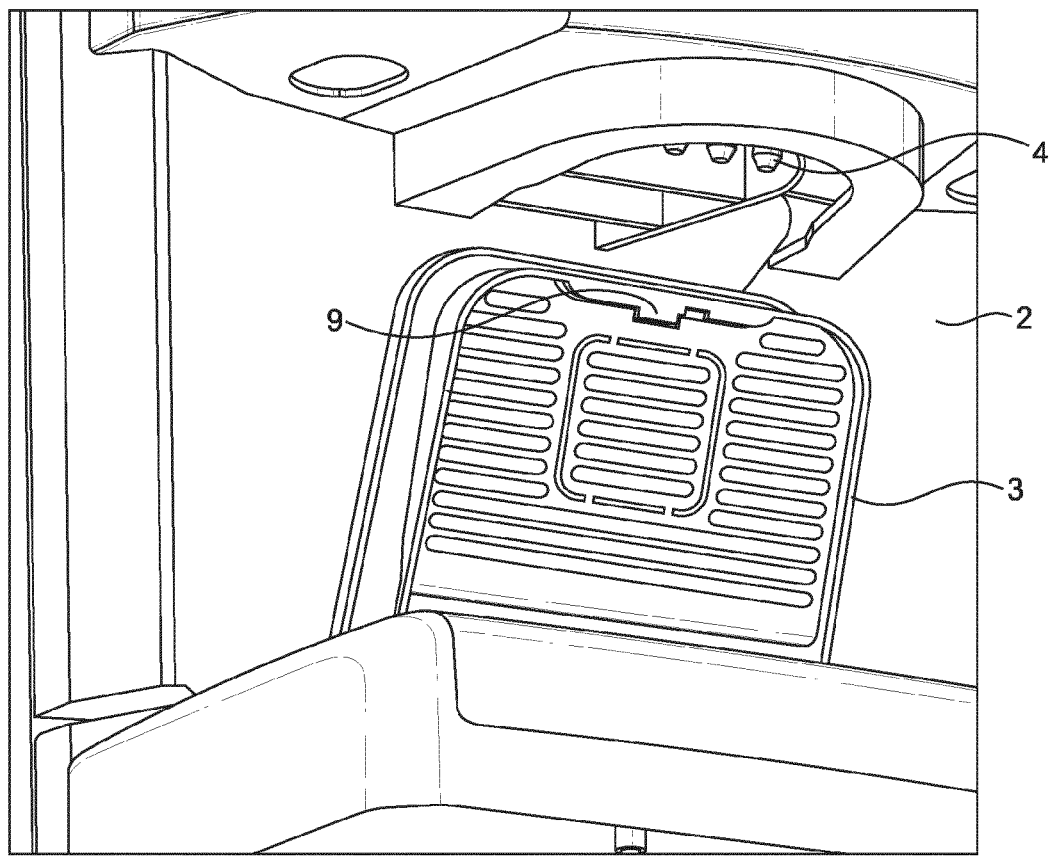
FIG. 4 is a view of the dispensing area of a beverage dispenser according to the present invention with the holding part of the holding system moving to the second retracted position.

With reference to FIGS. 1 to 3, the beverage dispenser bears the reference 1. The beverage dispenser according to the invention comprises a base 2. The machine comprises a beverage outlet 4 which may take various forms. The machine may comprise internally a beverage preparation module for brewing, dissolving and/or frothing a beverage ingredient and delivering the beverage through the beverage outlet 4. The dispenser according to the invention comprises a system for holding the drinking receptacle. The system is formed by a holding part 3 which goes underneath the beverage outlet 4 and projects cantilever-fashion from the base 2. "Projects cantilever-fashion" means that the holding part 3 continues from the device in at least one direction and is not supported from beneath, thus forming a sort of balcony. The holding part is placed at a predefined distance $D_0$ from the beverage outlet 4. This distance is defined so as to deliver an espresso coffee in optimal conditions that is without affecting the quality of the crema prepared in the beverage preparation module. If the cup is too far from the beverage outlet the quality of the espresso coffee is not optimised: in particular the crema does not present the correct aspect big bubbles being present at the top of the coffee, coffee might go outside of the receptacle or stain the internal walls of the receptacle above the top of the beverage. Besides, the distance is defined for accepting small or medium-size receptacles (meaning, for example, cups capable of holding approximately 25 to 250 ml respectively). A drip tray 5 is present at the basis of the machine. It is placed at a predefined distance $D_1$ from the beverage outlet 4—bigger than $D_0$—so that it can support bigger receptacles when the holding part 3 is moved out of the way of the beverage outlet. The holding part 3 is thus freely rotatable about an axis of rotation I relative to the base 2. The holding part 3 can be raised up out of the way of the beverage outlet, in which case a large receptacle can be put in position. The holding part 3 is preferably a grid so that drips can fall in the drip tray 5. FIG. 4 illustrates the upward movement of the holding part 3 to the retracted position The holding system also comprises a sensor for detecting the position of the holding part 3 between the first position and the second position. The sensor is preferably a capacitive sensor 8 (FIG. 3) that can be activated when the holding part 3 is raised up, the surface of the holding part 3 establishing the contact with the sensor when it is in the retracted position. When the holding part 3 is in the deployed position the capacitive sensor is deactivated. Consequently the sensor is able to sense either the deployed position or the retracted position. The process control of the dispenser is configured for deducing from the sensor signal or the absence of signal from the sensor that the holding part 3 is in the deployed or retracted position. The sensor can also be placed near the axis of rotation I of the holding part 3 so that when the holding part 3 is deployed its edge facing the base 2 touches or activates a sensor. In the case where an optical sensor is used, said sensor can be placed in a larger area than the area directly in contact with the holding part 3 in retracted or deployed position.

The holding part 3 can present a magnet 9 for enabling its locking in the retracted position. The magnet 9 can help for the contact with the sensor 8.

Figure 5:
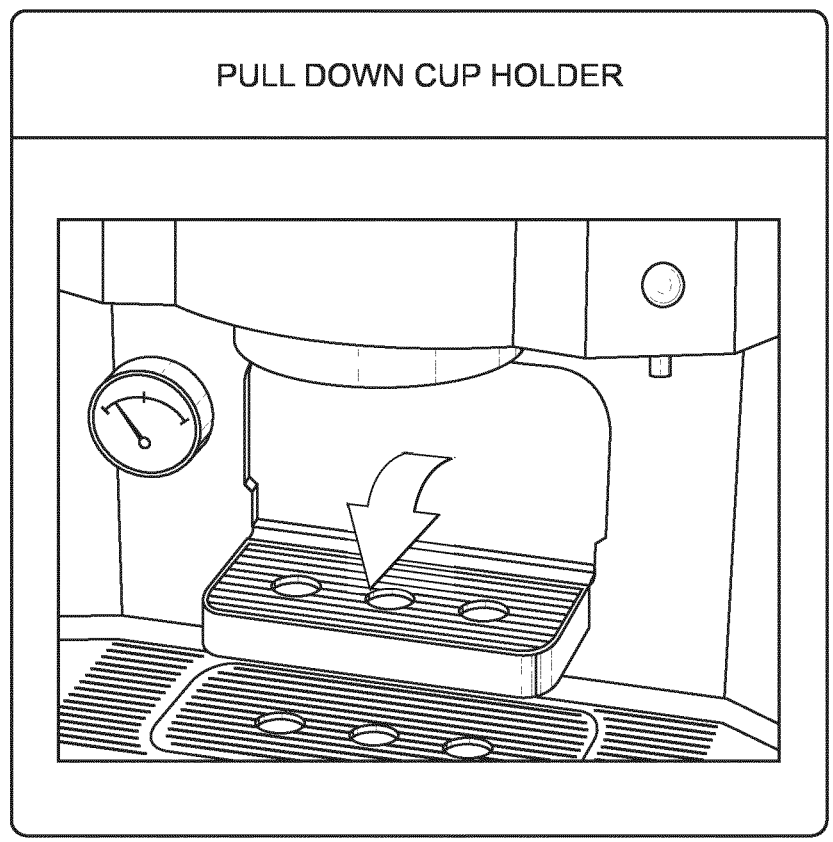
FIGS. 5 and 6 are illustrations of the beverage dispenser screen alerting the consumer.
Figure 6:
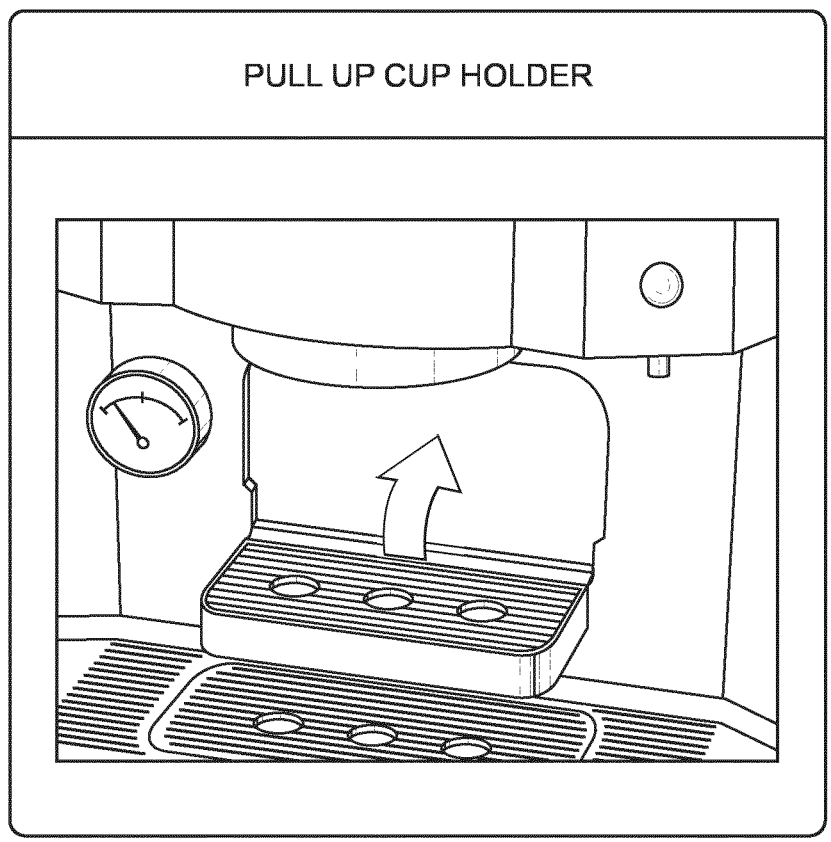

The beverage dispenser 1 also comprises an input device for selecting different beverages differing at least by the size of the dispensed beverage. In the illustrated dispenser, the input device comprises several buttons 6. According to the preferred embodiment the input device enables the preparation of an espresso coffee. The illustrated dispenser 1 also comprises an interface for displaying information to the consumer like a screen 7 and in particular to alert the consumer and incite him to move the holding part of the holding system from one position to the other if necessary as illustrated in FIGS. 5 and 6. In a simpler dispenser, the consumer can also be alerted by a simple light button associated to a written comment on the face of the dispenser inciting the consumer to correctly position the holding support in view of the selected beverage.

The operation of the dispenser for preparing a beverage consists in receiving the selection of a beverage by a consumer for example by choosing one of the 8 buttons 6 on the face of the dispenser. Each beverage proposed by the dispenser is generally defined by its composition and its volume. Consequently further to the selection of the beverage by the consumer the process control of the dispenser associates the size of a cup to the selected beverage volume. Then the process control checks the position of the holding part 3 by sensing if it is in the first or the second position and if this position corresponds to the size of the cup associated to the selected beverage. If not that is:

if the holding part 3 is deployed and a large receptacle is needed for dispensing the beverage, or if the holding part 3 is not deployed and a small receptacle is needed for dispensing the beverage, then the process control alerts the consumer and requests him to move the holding part in the other position.

When the position of the holding support 3 corresponds to the size of the cup associated to the selected beverage, the process control dispenses the selected beverage. In practice the alert message simply disappears and the customer is preferably asked to launch the dispensing of the beverage by touching a "Start" button so that he has time to place the cup on the holding part 3 placed in the correct position before the dispenser dispenses the beverage. If the position of the holding support 3 does not correspond to the size of the cup associated to the selected beverage, the dispenser does not dispense the selected beverage and the alert message remains apparent.

The dispenser of the present invention presents the advantage of guarantying that the ideal distance for delivering the beverage in a receptacle is implemented and that beverages of optimal quality are dispensed.

The invention claimed is:

1. A beverage dispenser configured to brew, dissolve and/or froth a beverage ingredient to form a beverage and then deliver the beverage through a beverage outlet for a consumer, the beverage dispenser comprising:
    an input device configured to accept a selection of different beverages differing at least by a size of the beverage that is dispensed;
    a base;
    a holding system that comprises a holding part positionable beneath the beverage outlet in order to accept a first, relatively small receptacle, and being configured and dimensioned to be moveable between a deployed holding position suitable for accepting the small receptacle and a second position in which the holding part is moved at least partly out of the way of the beverage outlet to create an unoccupied space in which a second, larger receptacle can be positioned, in place of the first receptacle, beneath the beverage outlet, the holding system comprises a sensor configured for detecting the position of the holding part between the deployed position and the second position; and
    an alerting device for causing the consumer to move the holding part of the holding system from one position to the other, the alerting device being activated based on a comparison between the beverage selected with the input device and the position of the holding part detected by the sensor.

2. The beverage dispenser of claim 1, wherein the beverage dispenser is configured for preparing at least an espresso coffee and/or a ristretto coffee.

3. The beverage dispenser of claim 1, wherein the sensor is a presence sensor.

4. The beverage dispenser of claim 1, wherein the holding part is associated with the base as a cantilever projection when the holder is in the deployed position.

5. The beverage dispenser of claim 1, wherein the holding part is configured and positioned for rotation between the deployed position and the second position.

6. The beverage dispenser of claim 5, wherein the holding part is hinged about an axis of rotation allowing the part to be moved upwards and out of the way of the beverage outlet.

* * * * *